(12) United States Patent
Zhang et al.

(10) Patent No.: US 12,327,187 B2
(45) Date of Patent: Jun. 10, 2025

(54) TIME-SERIES ANOMALY DETECTION VIA DEEP LEARNING

(71) Applicant: ADP, INC., Roseland, NJ (US)

(72) Inventors: Sheng Zhang, Harrison, NJ (US); Warren Douglas Campbell, Hackettstown, NJ (US); Yongmei Jia, Basking Ridge, NJ (US)

(73) Assignee: ADP, Inc., Roseland, NJ (US)

( * ) Notice: Subject to any disclaimer, the term of this patent is extended or adjusted under 35 U.S.C. 154(b) by 970 days.

(21) Appl. No.: 17/303,147

(22) Filed: May 21, 2021

(65) Prior Publication Data
US 2022/0374700 A1 Nov. 24, 2022

(51) Int. Cl.
*G06N 3/08* (2023.01)
*G06N 3/044* (2023.01)
*G06Q 10/1091* (2023.01)
*G06Q 40/12* (2023.01)

(52) U.S. Cl.
CPC .............. *G06N 3/08* (2013.01); *G06N 3/044* (2023.01); *G06Q 10/1091* (2013.01); *G06Q 40/125* (2013.12)

(58) Field of Classification Search
CPC .......... G06N 3/08; G06N 3/044; G06N 3/048; G06N 3/0442; G06N 3/084; G06N 3/09; G06Q 40/125; G06Q 10/1091
See application file for complete search history.

(56) References Cited

U.S. PATENT DOCUMENTS

| | | | |
|---|---|---|---|
| 9,306,966 B2 | 4/2016 | Eskin et al. | |
| 9,652,354 B2 | 5/2017 | Filimonov et al. | |
| 2015/0032738 A1* | 1/2015 | Nachnani | G06F 16/38 707/723 |
| 2019/0362245 A1* | 11/2019 | Buda | G06F 18/2433 |
| 2021/0004915 A1* | 1/2021 | Schrage | G06Q 40/125 |
| 2021/0097438 A1* | 4/2021 | Matsumoto | G06N 7/01 |

(Continued)

OTHER PUBLICATIONS

Kieu et al., "Outlier Detection for Time Series with Recurrent Autoencoder Ensembles," Proceedings of the Twenty-Eighth International Joint Conference on Artificial Intelligence (IJCAI-19), Aug. 10-16, 2019, Macao, China, 8 pages.

(Continued)

*Primary Examiner* — Dave Misir
(74) *Attorney, Agent, or Firm* — Foley & Lardner LLP

(57) ABSTRACT

A method for detecting anomalous data is provided. The method comprises collecting a training dataset comprising a number of transactional time series, wherein the time series comprise non-anomalous data entries for a specified transaction type. The training dataset is fed into a gated recurrent unit (GRU) network, which learns the data distribution for the transactional time series. The GRU predicts expected future values of the specified transaction type according to the learned data distribution. An upper bound and a lower bound for future values are calculated based a standard deviation of the predicted values. When new data entries of the specified transaction type are received their values are compared to the upper bound and the lower bound, and an error notification is provided if the values of the new data entries fall outside the upper bound or lower bound.

24 Claims, 7 Drawing Sheets

(56) References Cited

U.S. PATENT DOCUMENTS

2021/0209486 A1\* 7/2021 Fan ..................... G06N 20/20
2021/0248448 A1\* 8/2021 Branco .................. G06F 7/24

OTHER PUBLICATIONS

Zhang et al., "A Deep Neural Network for Unsupervised Anomaly Detection and Diagnosis in Multivariate Time Series Data," The Thirty-Third AAAI Conference on Artificial Intelligence (AAAI-19), Jan. 27-Feb. 1, 2019, Honolulu, Hawaii, 8 pages.

Guo et al., "Multidimensional Time Series Anomaly Detection: A GRU-based Gaussian Mixture Variational Autoencoder Approach," Proceedings of Machine Learning Research 2018, The 10th Asian Conference on Machine Learning, Beijing, China, Nov. 14-16, 2018, 16 pages.

Malhotra et al., "LSTM-based Encoder-Decoder for Multi-sensor Anomaly Detection," ICML 2016 Anomaly Detection Workshop, New York, New York, 2016, 5 pages. https://arxiv.org/pdf/1607.00148.pdf.

\* cited by examiner

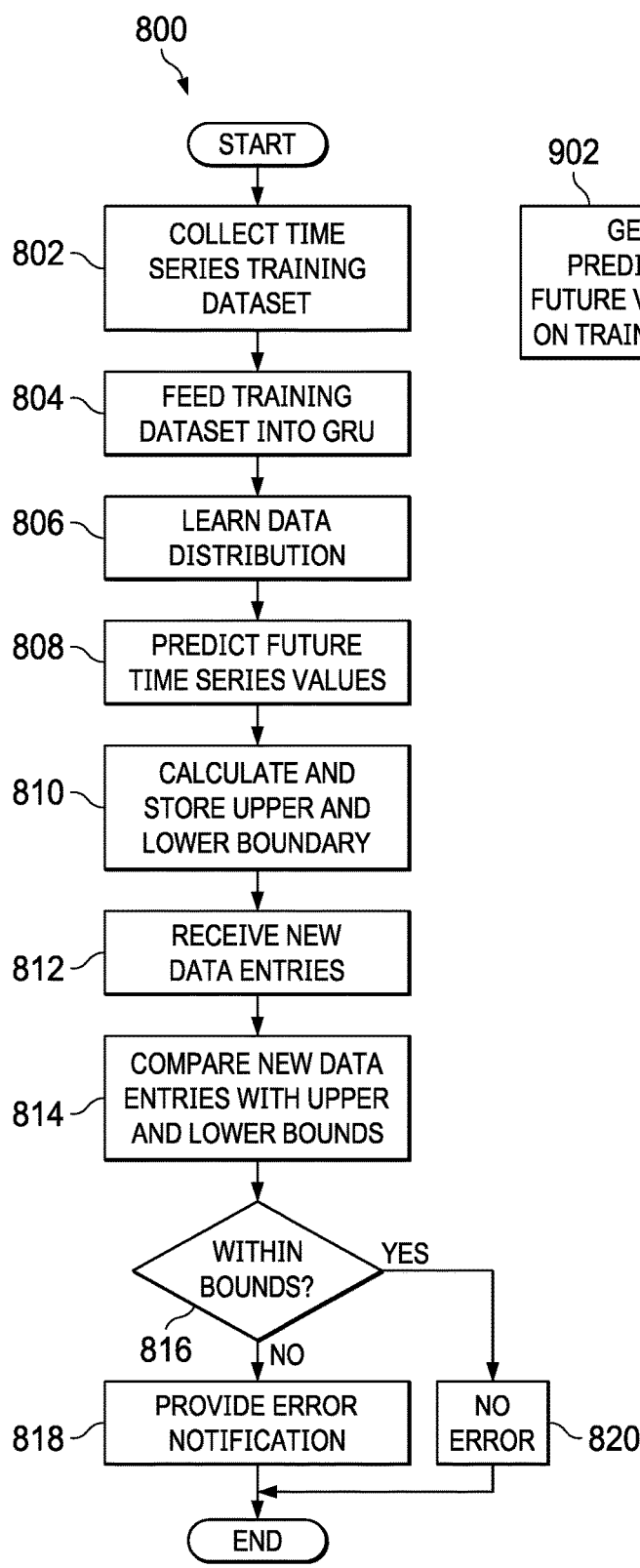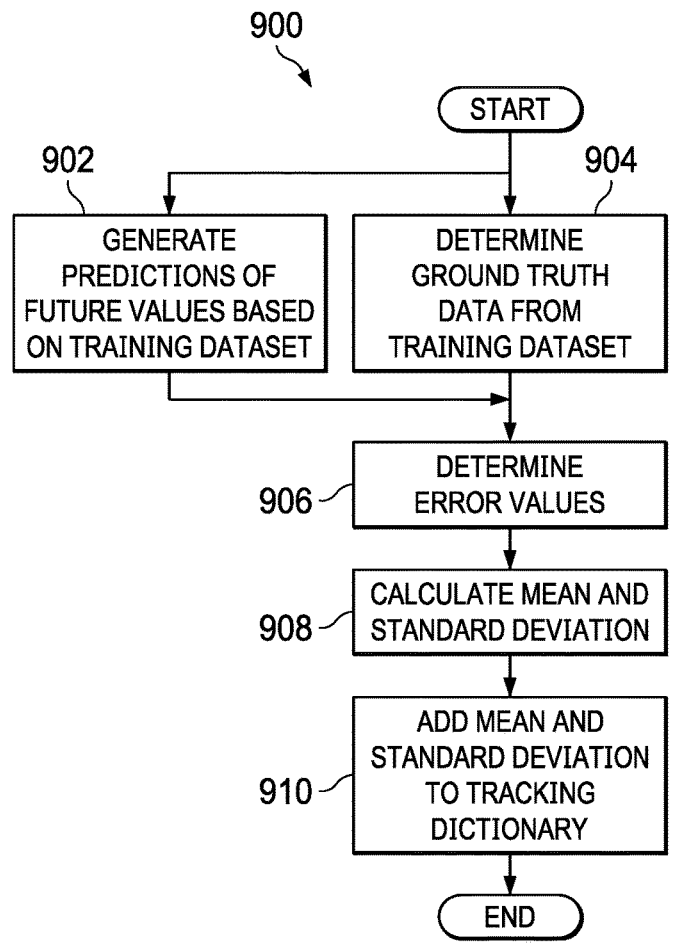
FIG. 8
FIG. 9

TIME-SERIES ANOMALY DETECTION VIA DEEP LEARNING

BACKGROUND INFORMATION

1. Field

The present disclosure relates generally to an improved computer system and, in particular, to deep machine learning to detect anomalies among normal time-series transactions.

2. Background

In large volumes of transaction data, detection of anomalies presents a challenge. Because normal data comprises the majority of data in a given data pool, identifying anomalies within that data pool can often be like finding a proverbial needle in a haystack.

In the case of recurrent time-series transactions, undiscovered errors might be perpetuated. For example, simple typographical errors in payroll data, if not identified, could potentially result in large, unnecessary cash outflows for organizations.

SUMMARY

An illustrative embodiment provides a computer-implemented method for detecting anomalous data. The method comprises collecting a training dataset comprising a number of transactional time series, wherein the time series comprise non-anomalous data entries for a specified transaction type. The training dataset is fed into a gated recurrent unit (GRU) network, which learns the data distribution for the transactional time series. The GRU predicts expected future values of the specified transaction type according to the learned data distribution. An upper bound and a lower bound for future values are calculated based a standard deviation of the predicted values. When new data entries of the specified transaction type are received their values are compared to the upper bound and the lower bound, and an error notification is provided if the values of the new data entries fall outside the upper bound or lower bound.

Another illustrative embodiment provides a system for detecting anomalous data. The system comprises a storage device configured to store program instructions and one or more processors operably connected to the storage device and configured to execute the program instructions to cause the system to: collect a training dataset comprising a number of transactional time series, wherein the time series comprise non-anomalous data entries for a specified transaction type; feed the training dataset into a gated recurrent unit (GRU) network; learn, by the GRU, a data distribution for the transactional time series; predict, by the GRU, expected future values of the specified transaction type according to the learned data distribution; calculate an upper bound and a lower bound for future values based a standard deviation of the predicted values; receive a number of new data entries of the specified transaction type; compare values of the new data entries to the upper bound and the lower bound; and provide an error notification if the values of the new data entries fall outside the upper bound or lower bound.

Another illustrative embodiment provides a computer program product for detecting anomalous data. The computer program product comprises a computer-readable storage medium having program instructions embodied thereon to perform the steps of: collecting a training dataset comprising a number of transactional time series, wherein the time series comprise non-anomalous data entries for a specified transaction type; feeding the training dataset into a gated recurrent unit (GRU) network; learning, by the GRU, a data distribution for the transactional time series; predicting, by the GRU, expected future values of the specified transaction type according to the learned data distribution; calculating an upper bound and a lower bound for future values based a standard deviation of the predicted values; receiving a number of new data entries of the specified transaction type; comparing values of the new data entries to the upper bound and the lower bound; and providing an error notification if the values of the new data entries fall outside the upper bound or lower bound.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 8 depicts a flowchart illustrating a process for detecting anomalous data in accordance with an illustrative embodiment;

FIG. 9 depicts a flowchart illustrating a process of learning a data distribution by an RNN in accordance with an illustrative embodiment.

DETAILED DESCRIPTION

The illustrative embodiments recognize and take into account one or more different considerations. For example, the illustrative embodiments recognize and take into account that detecting anomalies in large volumes of transaction data is a challenge.

Illustrative embodiments also recognize and take into account that undiscovered errors in recurrent transactions such as, e.g., payroll, can result in large, unnecessary cash outflows for organizations. In addition to simple errors, fraudulent activity such as fraudulent payroll entries or false work clock entries can cost organizations significant outflows.

Illustrative embodiments also recognize and take into account that the distribution of anomalous data is different from that of normal data.

Illustrative embodiments provide a method of predicting and detecting anomalies in time-series data. A machine learning model distinguishes differences in data distributions between normal and anomalous data. A predictor model is trained to capture the pattern of a time series and predict the value of a future time step. A detector function compares the prediction provided by the predictor with input by a user to determine if an input is normal or anomalous.

Figure 1:
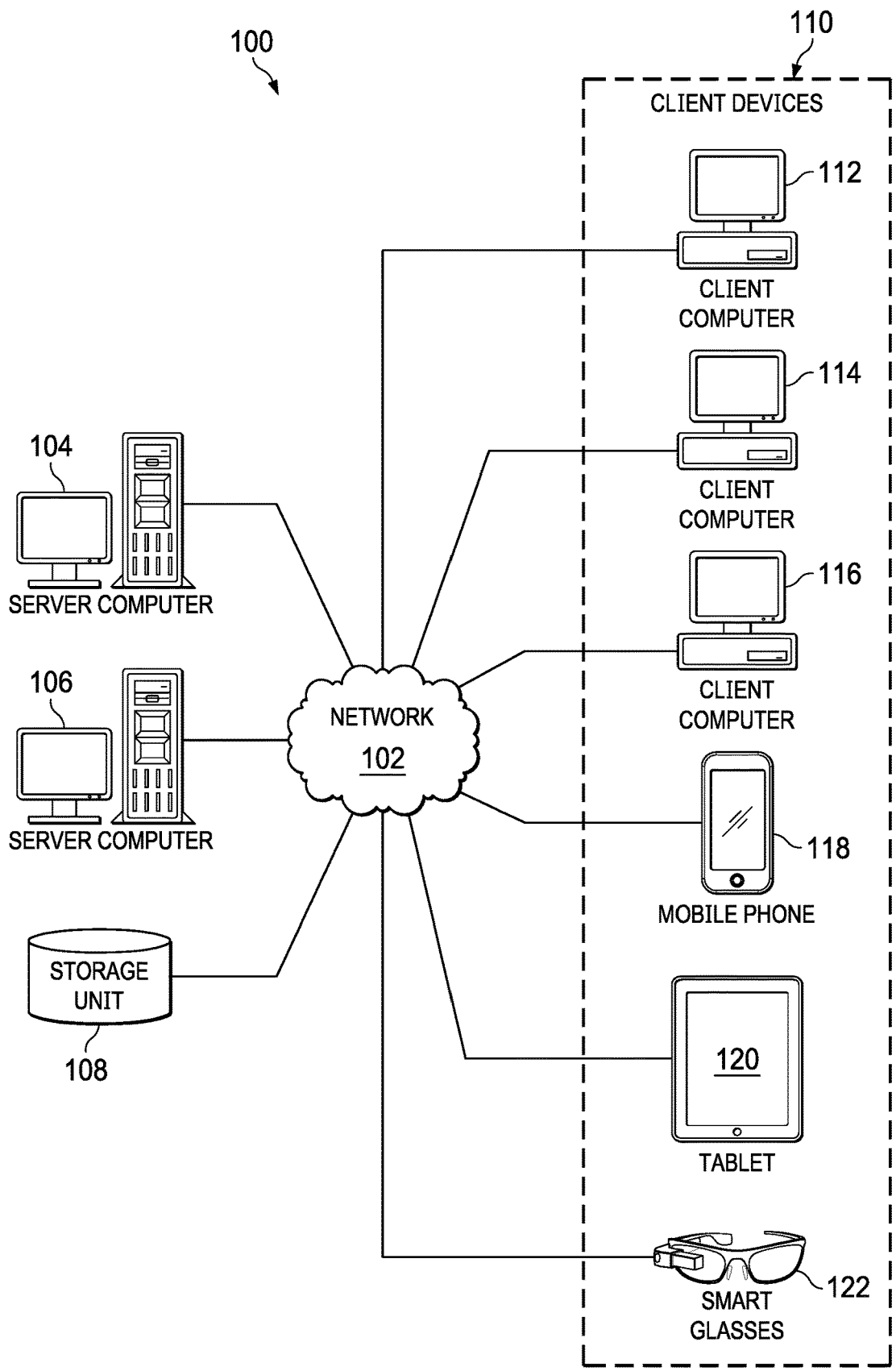
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
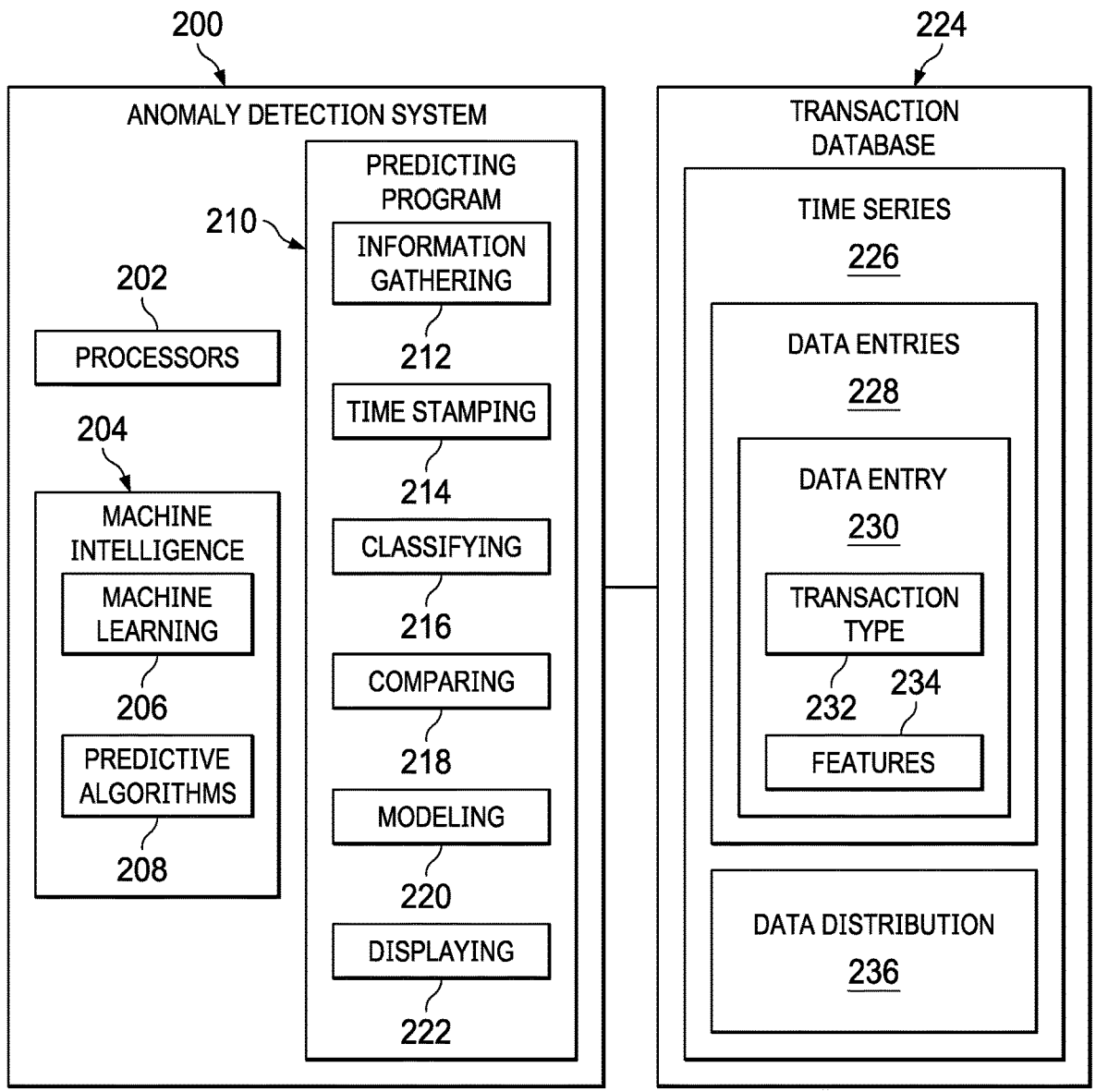
FIG. 2 is an illustration of a block diagram of a computer system for anomaly detection in accordance with an illustrative embodiment.

Turning to FIG. 2, a block diagram of a computer system for anomaly detection is depicted in accordance with an illustrative embodiment. Anomaly detection system 200 is connected to transaction database 224. Anomaly detection system 200 might be an example of server computer 104 in FIG. 1. Similarly, transaction database 224 might be implemented in storage such as storage unit 108 in FIG. 1.

Transaction database 224 comprises data about transactions within an organization. Several categories of transactions are stored in transaction database 224. These categories might include, for example, payroll and work time (job clock) entries. Data in transaction database 224 might be organized in a number of time series 226 comprising a number of data entries 228, which typically occur at regular period time intervals (e.g., daily, weekly, biweekly). The data entries 228 comprising a time series 226 have a characteristic distribution 236. Each data entry 230 has a transaction type 232 that identifies it as belonging a time series 226 of related data entries, e.g., payroll entries, work clock time entries, etc.

Each data entry 230 also has a number of features 234. In the case of a payroll transaction, for example, features 234 may include, but are not limited to, unique indicators of the company and employee, the date of the payment, the sum of the earnings (or pay amount), a fulltime/parttime binary value, a seasonal worker indicator, an indicator of whether the person paid is an independent contractor or an employee, an indicator of the payment frequency, and an indicator of whether or not the payroll was anomalous (an error).

Anomaly detection system 200 comprises information a number of processors 202, machine intelligence 204, and predicting program 210. Machine intelligence 204 comprises machine learning 206 and predictive algorithms 208.

Machine intelligence 204 can be implemented using one or more systems such as an artificial intelligence system, a neural network, a Bayesian network, an expert system, a fuzzy logic system, a genetic algorithm, or other suitable types of systems. Machine learning 206 and predictive algorithms 208 can make Anomaly detection system 200 a special purpose computer for dynamic predictive modelling.

In an embodiment, processors 202 comprises one or more conventional general-purpose central processing units (CPUs). In an alternate embodiment, processors 202 comprises one or more graphical processing units (GPUs). Though originally designed to accelerate the creation of images with millions of pixels whose frames need to be continually recalculated to display output in less than a second, GPUs are particularly well suited to machine learning. Their specialized parallel processing architecture allows them to perform many more floating-point operations per second then a CPU, on the order of 100× more. GPUs can be clustered together to run neural networks comprising hundreds of millions of connection nodes. Processors can also comprise a multicore processor, a physics processing unit (PPU), a digital signal processor (DSP), a network processor, or some other suitable type of processor. Further processors 202 can be homogenous or heterogeneous. For example, processors 202 can be central processing units. In another example, processors 202 can be a mix of central processing units and graphical processing units.

Predicting program 210 comprises information gathering 212, time stamping 214, classifying 216, comparing 218, modeling 220, displaying 222.

Anomaly detection system 200 can be implemented in software, hardware, firmware, or a combination thereof. When software is used, the operations performed by anomaly detection system 200 can be implemented in program code configured to run on hardware, such as a processor unit. When firmware is used, the operations performed by anomaly detection system 200 can be implemented in program code and data and stored in persistent memory to run on a processor unit. When hardware is employed, the hardware may include circuits that operate to perform the operations in anomaly detection system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

These components can be located in a computer system, which is a physical hardware system and includes one or more data processing systems. When more than one data processing system is present in the computer system, those data processing systems are in communication with each other using a communications medium. The communications medium can be a network. The data processing systems can be selected from at least one of a computer, a server computer, a tablet computer, or some other suitable data processing system.

There are three main categories of machine learning: supervised, unsupervised, and reinforcement learning. Supervised machine learning comprises providing the machine with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include k-means clustering, association analysis, and descending clustering.

Whereas supervised and unsupervised methods learn from a dataset, reinforcement learning methods learn from feedback to re-learn/retrain the models. Algorithms are used to train the predictive model through interacting with the environment using measurable performance criteria.

Figure 3:
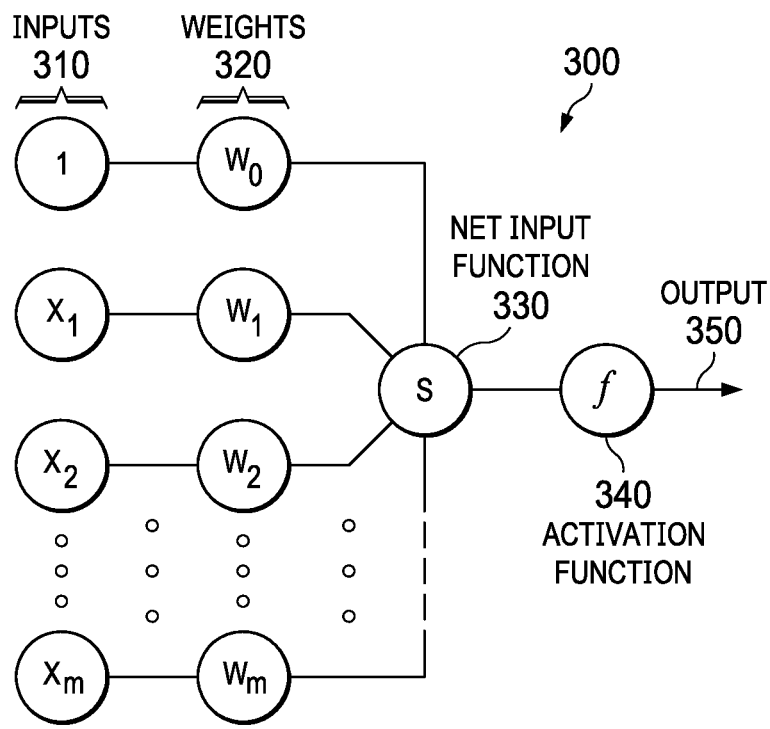
FIG. 3 is a diagram that illustrates a node in a neural network in which illustrative embodiments can be implemented.

FIG. 3 is a diagram that illustrates a node in a neural network in which illustrative embodiments can be implemented. Node 300 might comprise part of machine intelligence 204 in FIG. 2. Node 300 combines multiple inputs 310 from other nodes. Each input 310 is multiplied by a respective weight 320 that either amplifies or dampens that input, thereby assigning significance to each input for the task the algorithm is trying to learn. The weighted inputs are collected by a net input function 330 and then passed through an activation function 340 to determine the output 350. The connections between nodes are called edges. The respective weights of nodes and edges might change as learning proceeds, increasing or decreasing the weight of the respective signals at an edge. A node might only send a signal if the aggregate input signal exceeds a predefined threshold. Pairing adjustable weights with input features is how significance is assigned to those features with regard to how the network classifies and clusters input data.

Figure 4:
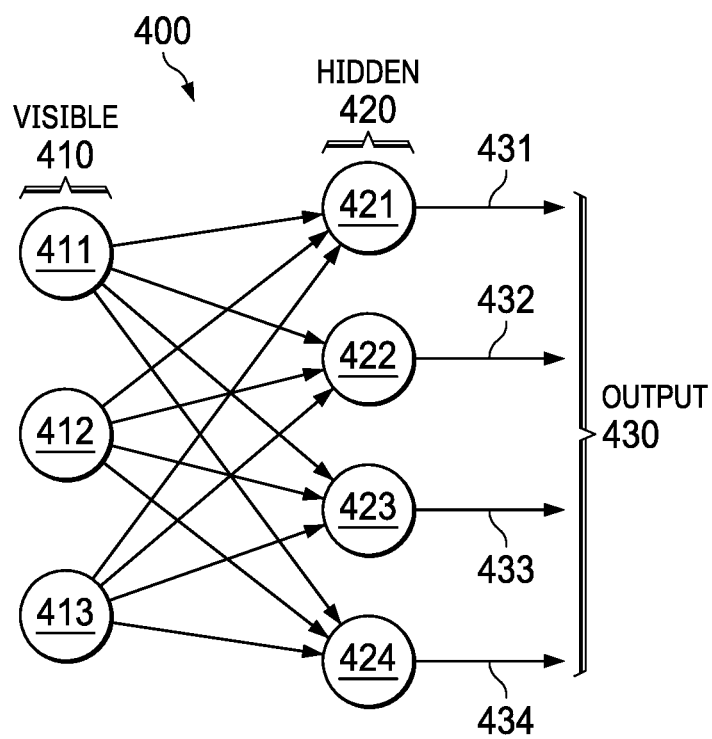
FIG. 4 is a diagram illustrating a full connected neural network in which illustrative embodiments can be implemented.

FIG. 4 is a diagram illustrating a neural network in which illustrative embodiments can be implemented. Neural network 400 might comprise part of machine intelligence 204 in FIG. 2 and is comprised of a number of nodes, such as node 300 in FIG. 3. As shown in FIG. 4, the nodes in the neural network 400 are divided into a layer of visible nodes 410, a layer of hidden nodes 420, and a layer of output nodes 430. Neural network 400 is an example of a fully connected neural network (FCNN) in which each node in a layer is connect to all of the nodes in an adjacent layer, but nodes within the same layer share no connections.

The visible nodes 410 are those that receive information from the environment (i.e. a set of external training data). Each of the visible nodes 410 takes a low-level feature from an item in the dataset and passes it to the layer of hidden nodes 420. When a node in the layer of hidden nodes 420 receives an input value x from a visible node in the layer of visible nodes 410 it multiplies x by the weight assigned to that connection (edge) and adds it to a bias b. The result of these two operations is then fed into an activation function which produces the node's output.

For example, when node 421 receives input from all of the visible nodes 411-413 each x value from the separate nodes is multiplied by its respective weight, and all of the products are summed. The summed products are then added to the hidden layer bias, and the result is passed through the activation function to produce output 431. A similar process is repeated at hidden nodes 422-424 to produce respective outputs 432-434. In the case of a deeper neural network, the output nodes 430 of the layer of hidden nodes 420 serve as inputs to the next hidden layer.

The layer of output nodes 430 is used to output density parameters. For example, the mean and variance for the Gaussian distribution. Usually, the FCNN is used to produce classification labels or regression values. However, the illustrative embodiments use it directly to produce the distribution parameters, which can be used to estimate the likelihood/probability of output events/time. The illustrative embodiments use the FCNN to output distribution parameters, which are used to generate the bundle change event and/or event-change-time (explained below).

Training a neural network is conducted with standard mini-batch stochastic gradient descent-based approaches, where the gradient is calculated with the standard back-propagation procedure. In addition to the neural network parameters, which need to be optimized during the learning procedure, there are the weights for different distributions, which also need to be optimized based on the underlying dataset. Since the weights are non-negative, they are mapped to the range [0,1] while simultaneously requiring them summed to be 1.

In machine learning, a cost function estimates how the model is performing. It is a measure of how wrong the model is in terms of its ability to estimate the relationship between input x and output y. This is expressed as a difference or distance between the predicted value and the actual value. The cost function (i.e. loss or error) can be estimated by iteratively running the model to compare estimated predictions against known values of y during supervised learning. The objective of a machine learning model, therefore, is to find parameters, weights, or a structure that minimizes the cost function.

Gradient descent is an optimization algorithm that attempts to find a local or global minima of a function, thereby enabling the model to learn the gradient or direction that the model should take in order to reduce errors. As the model iterates, it gradually converges towards a minimum where further tweaks to the parameters produce little or zero changes in the loss. At this point the model has optimized the weights such that they minimize the cost function.

Neural networks are often aggregated into layers, with different layers performing different kinds of transformations on their respective inputs. A node layer is a row of nodes that turn on or off as input is fed through the network. Signals travel from the first (input) layer to the last (output) layer, passing through any layers in between. Each layer's output acts as the next layer's input.

Neural networks can be stacked to create deep networks. After training one neural net, the activities of its hidden nodes can be used as input training data for a higher level, thereby allowing stacking of neural networks. Such stacking makes it possible to efficiently train several layers of hidden nodes.

A recurrent neural network (RNN) is a type of deep neural network in which the nodes are formed along a temporal sequence. RNNs exhibit temporal dynamic behavior, meaning they model behavior that varies over time. There are several variants of RNNs such as "vanilla" RNNs, Long Short-Term Memory (LSTM), Gated Recurrent Unit (GRU), and others with which the illustrative embodiments can be implemented.

Figure 5:
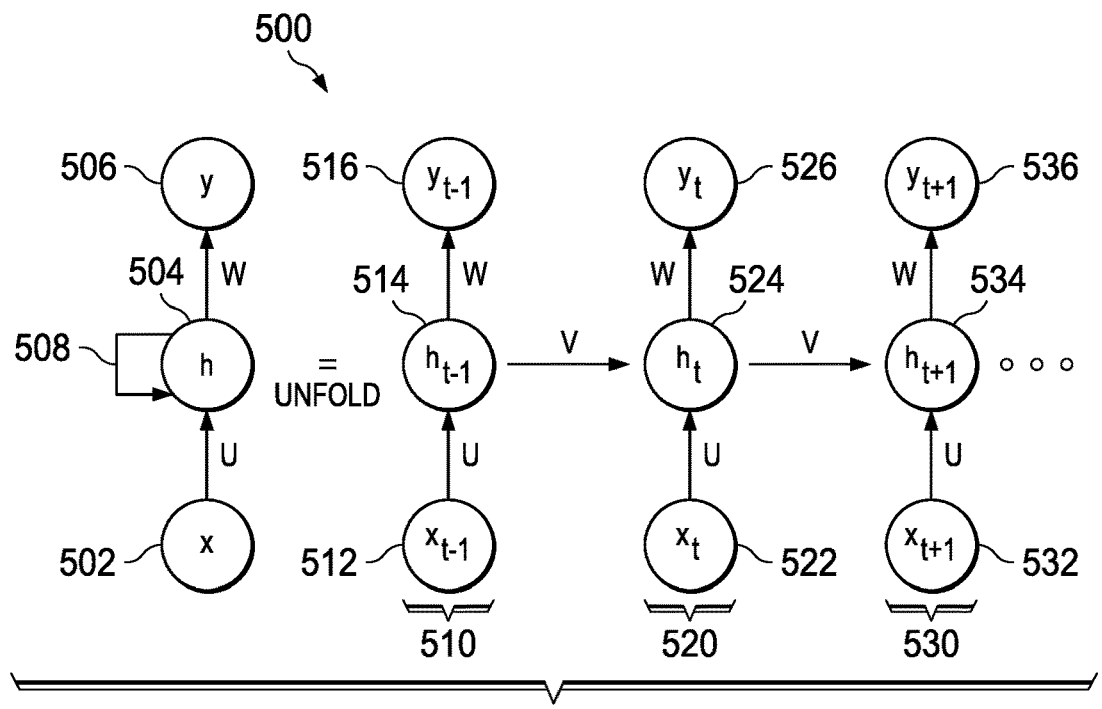
FIG. 5 illustrates an example of a recurrent neural network in which illustrative embodiments can be implemented.

FIG. 5 illustrates an example of a recurrent neural network in which illustrative embodiments can be implemented. RNN 500 might comprise part of machine intelligence 204 in FIG. 2. RNNs are recurrent because they perform the same task for every element of a sequence, with the output being depended on the previous computations. RNNs can be thought of as multiple copies of the same network, in which each copy passes a message to a successor. Whereas traditional neural networks process inputs independently, starting from scratch with each new input, RNNs persistence information from a previous input that informs processing of the next input in a sequence.

RNN 500 comprises an input vector 502, a hidden layer 504, and an output vector 506. RNN 500 also comprises loop 508 that allows information to persist from one input vector to the next. RNN 500 can be "unfolded" (or "unrolled") into a chain of layers, e.g., 510, 520, 530 to write out the RNN 500 for a complete sequence. Unlike a traditional neural network, which uses different weights at each layer, RNN 500 shares the same weights U, W, V across all steps. By providing the same weights and biases to all the layers 510, 520, 530, RNN 500 converts the independent activations into dependent activations.

The input vector 512 at time step t−1 is $x_{t-1}$. The hidden state $h_{t-1}$ 514 at time step t−1, which is required to calculate the first hidden state, is typically initialized to all zeroes. The output vector 516 at time step t−1 is $y_{t-1}$. Because of persistence in the network, at the next time step t, the state $h_t$ of the hidden state $h_t$ 524 is calculated based on the previous hidden state $h_{t-1}$ 514 and the new input vector $x_t$ 522. The hidden state $h_t$ acts as the "memory" of the network. Therefore, output $y_t$ 526 at time step t depends on the calculation at time step t−1. Similarly, output $y_{t+1}$ 536 at time step t+1 depends on hidden state $h_{t+1}$ 534, calculated from hidden state $h_t$ 524 and input vector $x_{t+1}$ 532.

By employing a GRU, the illustrative embodiments are able to model expected values of data entries in time series of specific transaction types. GRUs are advantageous over vanilla RNNs because they do not suffer gradient vanishing and therefore are more robust to long sequence data. Compared to LSTMs, GRUs have less parameters but offer similar, or sometimes better, performance.

Figure 6:
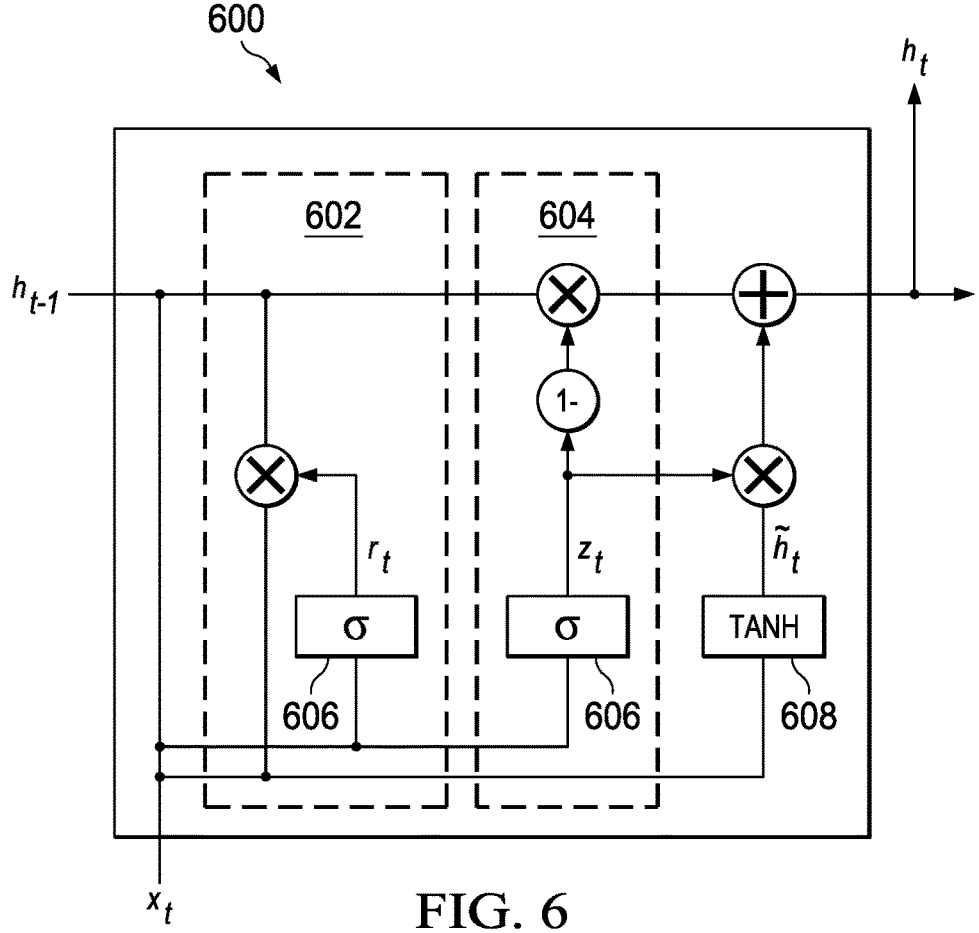
FIG. 6 illustrates an example of a gated recurrent unit in which illustrative embodiments can be implemented.

FIG. 6 illustrates an example of a gated recurrent unit in which illustrative embodiments can be implemented. GRU 600 may be implemented with RNN 500. GRU 600 illustrates the process of transitioning from hidden state $h_{t-1}$ to hidden state $h_t$. The parameters inside the model of GRU 600 are represented as V in FIG. 5.

GRU 600 comprises a reset gate 602 and an update gate 604. The resent gate 604 is a vector $r_t$ that helps the model determine how much information from previous hidden time steps to forget by filtering information that is irrelevant for prediction. The reset vector $r_t$ is calculated as a linear combination of the input vector $x_t$ of the current time step and the previous hidden state $h_{t-1}$. A sigmoid activation function a 606 is applied to the combination to squash the results between 0 and 1.

The update gate 602 is a vector $z_t$ that helps the model determine how much information from previous time steps to pass along to future time steps. As with the reset vector, the update vector $z_t$ is a product of the input $x_t$ and previous hidden state $h_{t-1}$ but with different trainable matrices and biases. Again, sigmoid activation function a 606 is applied to the combination to squash the results between 0 and 1.

A candidate activation vector $\tilde{h}_t$ is calculated as a combination of the input vector $x_t$ and the element-wise product of the reset vector $r_t$ and previous hidden state $h_{t-1}$. Non-linear activation function tank 608 is applied to the combination to produce an output in the range of −1 to 1.

The output vector $h_t$ is calculated as the combination of the element-wise product of the update vector $z_t$ and previous hidden state $h_{t-1}$ with the product of 1-$z_t$ and the candidate activation vector $\tilde{h}_t$. The output vector $h_t$ holds information for the current time step and passes it down the network. The model can learn to set the update vector $z_t$ close to 1 and keep a majority of the previous information, thereby avoiding a vanishing gradient.

Figure 7:
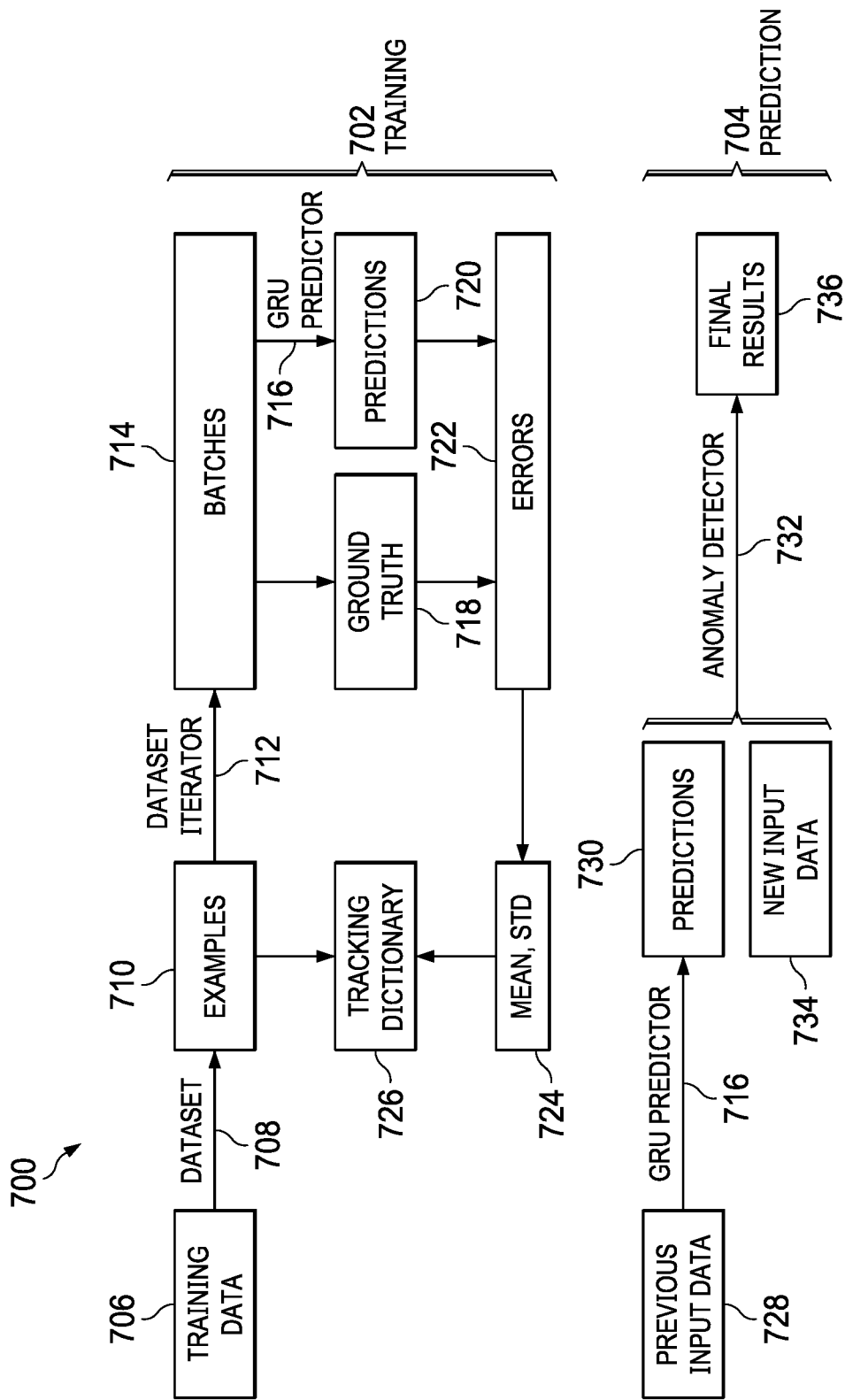
FIG. 7 depicts a diagram illustrating a process of detecting anomalous data in accordance with an illustrative embodiment.

FIG. 7 depicts a diagram illustrating a process of detecting anomalous data in accordance with an illustrative embodiment. Process 700 might be implemented in anomaly detection system 200 shown in FIG. 2.

Process 700 can be divided into training 702 and prediction/detection 704. The training process 702 begins by collecting training data 706 to form a training dataset 708.

Training data 706 might comprise, e.g., comma-separate value (CSV) files or any other appropriate format for storing data. Dataset 708 comprises a number of examples 710 of data entries comprising time series such as, e.g., historical paycheck time series.

Using the example of employee pay, a time series dataset 708 can be generated by collecting and aggregating historical pay amounts for many employees across several companies. Along with the series of pay amounts per employee, other quantitative and qualitative descriptors, called features, are aggregated and stored. The features of the dataset include, but are not limited to: unique indicators of the company and employee, the date of the payment, the sum of the earnings (or pay amount), a fulltime/parttime binary value, a seasonal worker indicator, an indicator of whether the person paid is an independent contractor (i.e., 1099) or an employee (i.e., W2), an indicator of the payment frequency (e.g., weekly, biweekly, monthly, quarterly, etc.), an indicator of whether or not the payroll was anomalous (an error). The GRU predictor 716 can use these features in the model, applying various weights where appropriate, to output the best predictions. Existing features may be removed from the dataset or additional features may be added to the dataset over time to improve the precision or accuracy of the result.

A dataset iterator 712 might divide these examples 710 into a number of batches 714. The batches 714 of training data are fed into an GRU predictor 716, which makes a number of predictions 720 of future values in the time series. Concurrently, ground truth data 718 is generated from the batches 714 for verification. The predictions 720 are compared to the ground truth data 718 to determine the errors 722 in the predictions by the GRU predictor 716. A mean and standard deviation 724 can be calculated from the errors 722 to determine acceptable upper and lower bounds (i.e., maximum and minimum error) for future predictions by the GRU predictor 716. Instead of directly calculating the mean and standard deviation of the next value (e.g., paycheck amount), this model can indirectly estimate the mean and standard deviation of the differences/errors between the prediction values and the customers' actual inputs. The potential ranges then are defined by the errors' boundaries (see the formula in above section). As the training continues, the potential input range, as well as the errors 722, are expected to be stable (as the predictions 720 converge to the ground truth data 718).

The mean and standard deviation 724 is then stored in a tracking dictionary 726 along with corresponding time series examples 710 from the dataset 708, thereby establishing error ranges for each historical example. Tracking dictionary 726 tracks and records the necessary info for all the examples 710, including the hidden states required by the GRU predictor 716 for re-training and predictions, and the statistics (mean/std values) for errors. The tracking dictionary 726 thereby ensures the important information can be carried from a previous training stage to a re-train/prediction stage.

The error thresholds established by the upper and lower bounds for predictions may depend on an establish variability of a time series such as, e.g., an employee's pay history. For example, an employee who is paid the same amount every time pay period (i.e., set salary) would have a low variability. In contrast, an employ who works on commission might have a relative higher variability and therefore, a larger prediction error threshold.

The upper bound and lower bound can be calculated with a specified multiplier of the standard deviation 724 of a batch 714. Therefore, if the specified multiplier is, e.g., 2.5, the error threshold is 2.5 times the standard deviation of the predicted expected value, e.g., pay amount for an employee. Any amount that falls outside the range of the upper and lower bounds indicates the presence of human error in the numerical entry in question.

During prediction/detection 704, previous input data 728 is fed to the trained GRU predictor 716, which makes predictions 730 regarding what the future values in the time series should be. Previous input data 728 comprises data input by the customer for the last time period t−1, e.g., pay period. The value predicted by the GRU predictor 716 is fed into detector 732 along with new input data 734 comprises data for the current time period t. In the payroll example, to predict whether the current paycheck amount is an anomaly or not, the model accepts the last paycheck amount as the input of the model and generates the upper and lower bounds for the next input from the customer/user.

Anomaly detector 732 compares the predictions 730 made by the GRU predictor 716 to the upper and lower bounds calculated from the standard deviation. The absolute error between the predictions 730 and the customer's new input data 734 is calculated as $$error = |prediction - input|$$

The comfortable zone for the error (or acceptable error range) can be defined as $$error = (0, \mu + \alpha * \sigma)$$

where $\mu$ is the error mean, $\sigma$ is the error std, and $\alpha$ is a hyper-parameter that needs to be tuned.

Finally the potential input range can be calculated as $$input = (prediction - \mu - \alpha * \sigma, prediction + \alpha + \alpha * \sigma)$$

If any data entries fall outside this range, the final result 736 indicates the presence of anomalous data entries.

The GRU predictor model might be retrained at regular intervals (e.g., quarterly, monthly) during which previous input data 728 and new input data 734 might be included in training data 706 for the retraining.

FIG. 8 depicts a flowchart illustrating a process for detecting anomalous data in accordance with an illustrative embodiment. Process 800 can be implemented in hardware, software, or both. When implemented in software, the process can take the form of program code that is run by one of more processor units located in one or more hardware devices in one or more computer systems. Process 800 might be implemented in anomaly detection system 200 in FIG. 2.

Process 800 begins by collecting a training dataset comprising a number of transactional time series (step 802). The training dataset might be pulled from a number of comma-separated value files. The time series comprise non-anomalous data entries for a specified transaction type. The transaction type might comprise, e.g., work time entries, payroll entries, etc. The training dataset might be also divided into a number of batches.

The training dataset is fed into a gated recurrent neural network (GRU) (step 804), and the GRU learns a data distribution for the transactional time series (step 806). Learning the data distribution by the GRU might comprise supervised machine learning. The GRU then predicts expected future values (step 808).

An upper bound and a lower bound for future values are calculated based on a standard deviation of the predicted values and then stored in a tracking dictionary (step 810). The upper bound and lower bound are calculated from the standard deviation and a specified multiplier for the specified transaction type according to the learned data distribution.

A number of new data entries of the specified transaction type are received (step 812). The anomaly detector compares values of the new data entries to the stored upper bound and lower bound (step 814).

If the values of the new data entries fall outside the upper bound or lower bound (step 816), the anomaly detection provides an error notification, which can be displayed on a user interface (step 818). If the values of the new data entries fall within the upper bound or lower bound, no error is present (step 820). Process 800 then ends.

FIG. 9 depicts a flowchart illustrating a process of learning a data distribution by a GRU in accordance with an illustrative embodiment. Process 900 can be implemented in hardware, software, or both. When implemented in software, the process can take the form of program code that is run by one of more processor units located in one or more hardware devices in one or more computer systems. Process 900 might be a detailed example of step 806 in FIG. 8.

Process 900 begins with the GRU generating a number of predictions of future values based on the training dataset (step 902). Ground truth data are also determined from the training dataset (step 904). A number of error values between the predictions and the ground truth data for the training dataset are determined (step 906), and a mean standard deviation of the errors is calculated (step 908). The mean and standard deviation are then added to a tracking dictionary along with the time series examples comprising the training dataset (step 910). Process 900 then ends.

Figure 10:
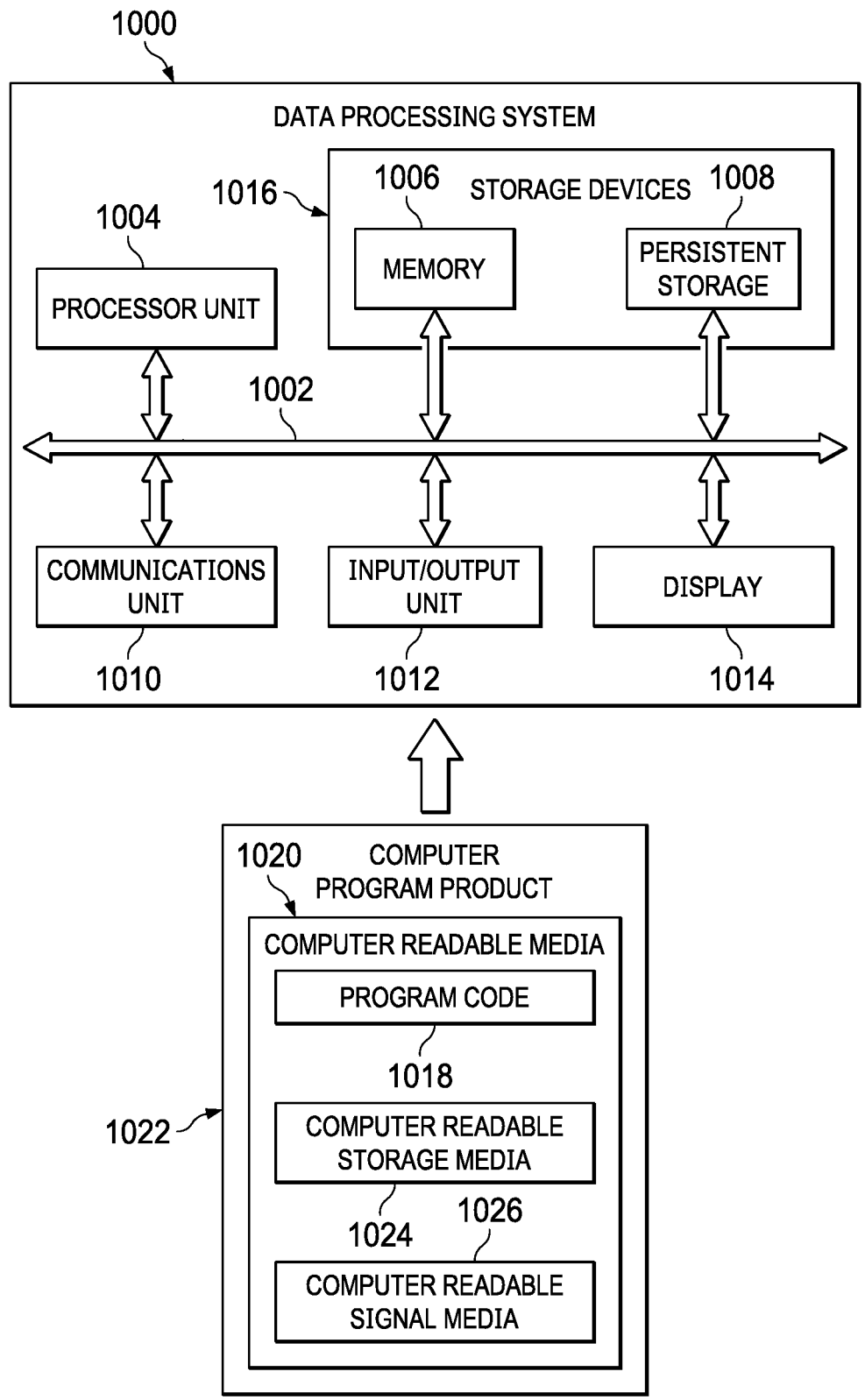
FIG. 10 is an illustration of a block diagram of a data processing system in accordance with an illustrative embodiment.

Turning now to FIG. 10, an illustration of a block diagram of a data processing system is depicted in accordance with an illustrative embodiment. Data processing system 1000 may be used to implement one or more computers systems such as server computers 104, 106 and client devices 110 in FIG. 1 and anomaly detection system 200 in FIG. 2. In this illustrative example, data processing system 1000 includes communications framework 1002, which provides communications between processor unit 1004, memory 1006, persistent storage 1008, communications unit 1010, input/output unit 1012, and display 1014. In this example, communications framework 1002 may take the form of a bus system.

Processor unit 1004 serves to execute instructions for software that may be loaded into memory 1006. Processor unit 1004 may be a number of processors, a multi-processor core, or some other type of processor, depending on the particular implementation. In an embodiment, processor unit 1004 comprises one or more conventional general-purpose central processing units (CPUs). In an alternate embodiment, processor unit 1004 comprises one or more graphical processing units (CPUs).

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008. Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer-usable program code, or computer-readable program code that may be read and executed by a processor in processor unit 1004. The program code in the different embodiments may be embodied on different physical or computer-readable storage media, such as memory 1006 or persistent storage 1008.

Program code 1018 is located in a functional form on computer-readable media 1020 that is selectively removable and may be loaded onto or transferred to data processing system 1000 for execution by processor unit 1004. Program code 1018 and computer-readable media 1020 form computer program product 1022 in these illustrative examples. In one example, computer-readable media 1020 may be computer-readable storage media 1024 or computer-readable signal media 1026.

In these illustrative examples, computer-readable storage media 1024 is a physical or tangible storage device used to store program code 1018 rather than a medium that propagates or transmits program code 1018. Alternatively, program code 1018 may be transferred to data processing system 1000 using computer-readable signal media 1026.

Computer-readable signal media 1026 may be, for example, a propagated data signal containing program code 1018. For example, computer-readable signal media 1026 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code 1018.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implement method for detecting anomalous data and identifying fraudulent transactions, the method comprising:
    collecting, by one or more processors, coupled with memory, a training dataset comprising a number of transactional time series, wherein the transactional time series comprise non-anomalous data entries;
    identifying, by the one or more processors, a transaction type corresponding with the transactional time series;
    feeding, by the one or more processors, the training dataset into a gated recurrent unit (GRU) network comprising a plurality of nodes;
    learning, by the one or more processors, the GRU, a data distribution for the transactional time series by iteratively adjusting one or more weights corresponding to the plurality of nodes;
    predicting, by the one or more processors, the GRU, expected future values of the transaction type according to the learned data distribution;
    determining, by the one or more processors, an upper bound and a lower bound for future values based on a standard deviation of the predicted expected future values;
    storing, by the one or more processors, information comprising the standard deviation, at least a portion of the transactional time series, and one or more hidden states corresponding to the plurality of nodes in a tracking dictionary for re-training the GRU;
    generating, by the one or more processors, using the GRU, a plurality of predictions of the future values based on the training dataset and the stored information in the tracking dictionary;
    receiving, by the one or more processors, a number of new data entries of the transaction type;
    determining, by the one or more processors, a value of the new data entries falls outside the upper bound or the lower bound;
    providing, by the one or more processors, responsive to determining the value of the new data entries falls outside the upper bound or the lower bound, an error notification corresponding with a detected anomaly; and
    displaying, by the one or more processors, the error notification on a user interface.

2. The method of claim 1, wherein learning the data distribution using the GRU comprises:
    determining, by the one or more processors, ground truth data from the training dataset;
    determining, by the one or more processors, a number of error values between the plurality of predictions and the ground truth data for the training dataset; and
    calculating, by the one or more processors, a mean and standard deviation of the error values.

3. The method of claim 1, further comprising:
    dividing, by the one or more processors, the training dataset into a number of batches.

4. The method of claim 1, wherein learning the data distribution using the GRU comprises supervised learning.

5. The method of claim 1, wherein the transaction type comprises payroll entries.

6. The method of claim 1, wherein the transaction type comprises work time entries.

7. The method of claim 1, wherein the training dataset is pulled from a number of comma-separated value files.

8. The method of claim 1, wherein the upper bound and lower bound are computed from the standard deviation and a specified multiplier.

9. A system for detecting anomalous data and identifying fraudulent transactions, the system comprising:
    a storage device configured to store program instructions; and
    one or more processors operably connected to the storage device and configured to execute the program instructions to cause the system to:

collect a training dataset comprising a number of transactional time series, wherein the transactional time series comprise non-anomalous data entries;

identify a transaction type corresponding with the transactional time series;

feed the training dataset into a gated recurrent unit (GRU) network comprising a plurality of nodes;

learn, using the GRU, a data distribution for the transactional time series by iteratively adjusting one or more weights assigned to the plurality of nodes;

predict, using the GRU, expected future values of the transaction type according to the learned data distribution;

determine an upper bound and a lower bound for future values based on a standard deviation of the predicted expected future values;

store information comprising the standard deviation, at least a portion of the transactional time series, and one or more hidden states corresponding to the plurality of nodes in a tracking dictionary for re-training the GRU;

generate, using the GRU, a plurality of predictions of the future values based on the training dataset and the stored information in the tracking dictionary;

receive a number of new data entries of the transaction type;

determine a value of the new data entries falls outside the upper bound or the lower bound;

provide, responsive to determining the value of the new data entries falls outside the upper bound or the lower bound, an error notification corresponding with a detected anomaly; and display the error notification on a user interface.

10. The system of claim 9, wherein learning the data distribution using the GRU comprises:

determining ground truth data from the training dataset;

determining a number of error values between the plurality of predictions and the ground truth data for the training dataset; and calculating a mean and standard deviation of the error values.

11. The system of claim 9, wherein the one or more processors divide the training dataset into a number of batches.

12. The system of claim 9, wherein learning the data distribution using the GRU comprises supervised learning.

13. The system of claim 9, wherein the transaction type comprises payroll entries.

14. The system of claim 9, wherein the transaction type comprises work time entries.

15. The system of claim 9, wherein the training dataset is pulled from a number of comma-separated value files.

16. The system of claim 9, wherein the upper bound and lower bound are computed from the standard deviation and a specified multiplier.

17. A computer program product for detecting anomalous data and identifying fraudulent transactions, the computer program product comprising:

a non-transitory computer-readable storage medium having program instructions stored thereon, the instructions executable by one or more processors to perform operations comprising:

collecting a training dataset comprising a number of transactional time series, wherein the transactional time series comprise non-anomalous data entries;

identifying a transaction type corresponding with the transactional time series;

feeding the training dataset into a gated recurrent unit (GRU) network comprising a plurality of nodes;

learning, using the GRU, a data distribution for the transactional time series by iteratively adjusting one or more weights corresponding to the plurality of nodes;

predicting, using the GRU, expected future values of the transaction type according to the learned data distribution;

determining an upper bound and a lower bound for future values based on a standard deviation of the predicted expected future values;

storing information comprising the standard deviation, at least a portion of the transactional time series, and one or more hidden states corresponding to the plurality of nodes in a tracking dictionary for re-training the GRU;

generate, using the GRU, a plurality of predictions of the future values based on the training dataset and the stored information in the tracking dictionary;

receiving a number of new data entries of the transaction type;

determining a value of the new data entries falls outside the upper bound or the lower bound;

providing, responsive to determining the value of the new data entries falls outside the upper bound or the lower bound, an error notification corresponding with a detected anomaly; and displaying the error notification on a user interface.

18. The computer program product of claim 17, wherein learning the data distribution using the GRU comprises:

determining ground truth data from the training dataset;

determining a number of error values between the plurality of predictions and the ground truth data for the training dataset; and calculating a mean and standard deviation of the error values.

19. The computer program product of claim 17, further comprising dividing the training dataset into a number of batches.

20. The computer program product of claim 17, wherein learning the data distribution using the GRU comprises supervised learning.

21. The computer program product of claim 17, wherein the transaction type comprises payroll entries.

22. The computer program product of claim 17, wherein the transaction type comprises work time entries.

23. The computer program product of claim 17, wherein the training dataset is pulled from a number of comma-separated value files.

24. The computer program product of claim 17, wherein the upper bound and lower bound are computed from the standard deviation and a specified multiplier.

* * * * *

UNITED STATES PATENT AND TRADEMARK OFFICE
CERTIFICATE OF CORRECTION

| | | |
|---|---|---|
| PATENT NO. | : 12,327,187 B2 | Page 1 of 1 |
| APPLICATION NO. | : 17/303147 | |
| DATED | : June 10, 2025 | |
| INVENTOR(S) | : Sheng Zhang, Warren Douglas Campbell and Yongmei Jia | |

It is certified that error appears in the above-identified patent and that said Letters Patent is hereby corrected as shown below:

In the Claims

In Claim 1, Column 14, Line 6, please delete "learning, by the one or more processors, the GRU, a data" and replace with --learning, by the one or more processors, using the GRU, a data--

In Claim 1, Column 14, Line 10, please delete "predicting, by the one or more processors, the GRU," and replace with --predicting, by the one or more processors, using the GRU,--

Signed and Sealed this
Twenty-third Day of December, 2025

John A. Squires
*Director of the United States Patent and Trademark Office*